United States Patent
Kim et al.

(10) Patent No.: US 10,739,939 B2
(45) Date of Patent: Aug. 11, 2020

(54) CONTROL OF ICON MOVEMENT ON A GRAPHICAL USER INTERFACE

(71) Applicant: INTERNATIONAL BUSINESS MACHINES CORPORATION, Armonk, NY (US)

(72) Inventors: Minkyong Kim, Scarsdale, NY (US); James R. Kozloski, New Fairfield, CT (US); Clifford A. Pickover, Yorktown Heights, NY (US); Maja Vukovic, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 1025 days.

(21) Appl. No.: 14/697,810

(22) Filed: Apr. 28, 2015

(65) Prior Publication Data

US 2016/0320943 A1  Nov. 3, 2016

(51) Int. Cl.
*G06F 3/0481* (2013.01)
*G06F 3/0486* (2013.01)

(52) U.S. Cl.
CPC ........ *G06F 3/04817* (2013.01); *G06F 3/0486* (2013.01)

(58) Field of Classification Search
CPC .................. G06F 3/0486; G06F 3/04817
See application file for complete search history.

(56) References Cited

U.S. PATENT DOCUMENTS

| | | | |
|---|---|---|---|
| 6,392,675 B1 * | 5/2002 | Becker | G06F 3/04812 715/856 |
| 6,545,669 B1 * | 4/2003 | Kinawi | G06F 3/0486 345/1.1 |
| 8,127,240 B2 | 2/2012 | Grotjohn et al. | |
| 8,572,757 B1 | 10/2013 | Stamos et al. | |
| 8,745,267 B2 | 6/2014 | Luecke et al. | |
| 8,825,846 B2 | 9/2014 | Goncharov | |

(Continued)

FOREIGN PATENT DOCUMENTS

WO  2007133969 A1  11/2007
WO  2014159905 A1  10/2014

OTHER PUBLICATIONS

P. Mell et al., "The NIST Definition of Cloud Computing", National Institute of Standards and Technology, Information Technology Laboratory, Sep. 2011, pp. 1-7.

(Continued)

*Primary Examiner* — Jennifer N To
*Assistant Examiner* — Eric J Yoon
(74) *Attorney, Agent, or Firm* — Law Office of Jim Boice

(57) ABSTRACT

A method, computer program product, and/or computer system controls icon movement behavior on a graphical user interface. A file hosting icon and a data file icon are displayed on a graphical user interface (GUI). The file hosting icon represents a file hosting service, and the data file icon, which is capable of being moved towards the file hosting icon on the GUI to initiate storage by the file hosting service, represents data. The behavior of movement of the data file icon is adjusted according to a position of the data file icon relative to a position of the file hosting icon on the GUI, and based on predefined features of the data relative to predefined features of the file hosting service.

15 Claims, 8 Drawing Sheets

(56) References Cited

U.S. PATENT DOCUMENTS

| | | | | |
|---|---|---|---|---|
| 2009/0292999 | A1* | 11/2009 | LaBine | G06F 3/1454 |
| | | | | 715/740 |
| 2012/0084689 | A1 | 4/2012 | Ledet et al. | |
| 2013/0097542 | A1* | 4/2013 | Icho | G06F 17/30032 |
| | | | | 715/769 |
| 2013/0145325 | A1 | 6/2013 | Ording et al. | |
| 2013/0212432 | A1* | 8/2013 | Guthrie | G06F 11/0709 |
| | | | | 714/16 |
| 2013/0297662 | A1* | 11/2013 | Sharma | H04L 63/0815 |
| | | | | 707/827 |
| 2014/0101434 | A1 | 4/2014 | Senthurpandi et al. | |

OTHER PUBLICATIONS

W. Cunningham, "File System Alternatives", Cunningham & Cunningham, Inc., c2.com, last edited Jul. 16, 2014, retrieved Apr. 28, 2015, pp. 1-16.

Anonymous, "Force-Directed Graph Drawing" Wikimedia Foundation, Inc., wikipedia.org, last modified Apr. 16, 2015, retrieved Apr. 28, 2015, pp. 1-7.

\* cited by examiner

CONTROL OF ICON MOVEMENT ON A GRAPHICAL USER INTERFACE

BACKGROUND

The present disclosure relates to the field of electronic devices, and specifically to the field of electronic devices that display content on a user interface. Still more specifically, the present disclosure relates to the field of controlling the behavior of icon movement on a graphical user interface.

A file hosting service is a network-based service that is designed to store, provide, protect, and otherwise manage clients' files, including but not limited to text files, photo files, video files, accounting files, etc. This allows a client device, such as a computer, smart phone, etc., to access data as needed, rather than storing the data on the client device. Accessing and storing such data can be performed through the use of icons on a graphical user interface on the client device.

SUMMARY

A method, computer program product, and/or computer system controls icon movement behavior on a graphical user interface. A file hosting icon and a data file icon are displayed on a graphical user interface (GUI). The file hosting icon represents a file hosting service, and the data file icon, which is capable of being moved towards the file hosting icon on the GUI to initiate storage by the file hosting service, represents data. The behavior of movement of the data file icon is adjusted according to a position of the data file icon relative to a position of the file hosting icon on the GUI, and based on predefined features of the data relative to predefined features of the file hosting service.

DETAILED DESCRIPTION

Figure 1:
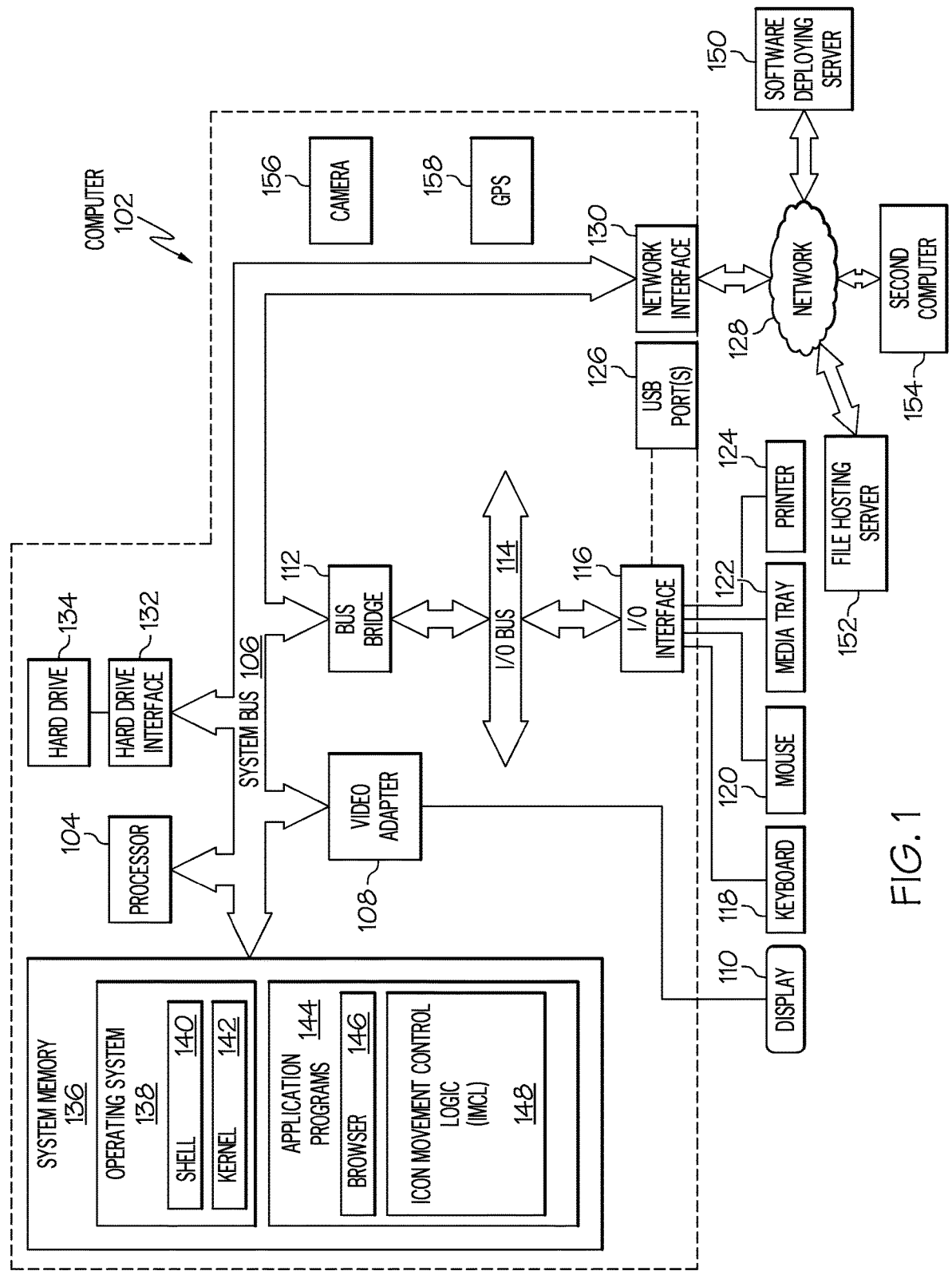
FIG. 1 depicts an exemplary system and network in which the present disclosure may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 102 may be utilized by software deploying server 150 and/or file hosting server 152 and/or second computer 154 shown in FIG. 1.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150, using a network interface 130. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include an Icon Movement Control Logic (IMCL) 148. IMCL 148 includes code for implementing the processes described below, including those described in FIGS. 2-8. In one embodiment, computer 102 is able to download IMCL 148 from software deploying server 150, including in an on-demand basis, wherein the code in IMCL 148 is not downloaded until needed for execution. In one embodiment of the present invention, software deploying server 150 performs all of the functions associated with the present invention (including execution of IMCL 148), thus freeing computer 102 from having to use its own internal computing resources to execute IMCL 148.

In one or more embodiments of the present invention, computer 102 includes a geographic locator, such as a global positioning system (GPS) device 158 that utilizes signals from GPS satellites to determine the current geophysical/ geographic position of the computer 102.

In one or more embodiments of the present invention, computer 102 includes a camera 156, which is capable of taking still or moving photos of an environment of the computer 102, including a user of computer 102, a physical appearance of a location in which computer 102 is located, etc.

The hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

The terms "data" and "file" and "data file" are used interchangeably in the present disclosure. That is, a "file" (or "data file") is a logical collection of "data". Thus, moving a "file"/"data file" is moving a collection of "data", and moving "data" is moving the contents of a "file"/"data file". The "data" may be text data, numeric data, video or photo data (i.e., digitized images), or any other type of information that can be stored in a digital format within an electronic storage device.

Disclosed herein is a method and system that utilizes a file hosting service with graphical user interface (GUI) features. In one or more embodiments, these GUI features include a drag-and-drop interface in which user data files (represented by one or more data file icons) may be dragged to a GUI representation for the file hosting service (i.e., a file hosting icon). Characteristics of this drag-and-drop operation are adjusted according to 1) characteristics of the data represented by the data file icon(s), and 2) characteristics of the file hosting service represented by the file hosting icon.

For example and as described herein, the GUI changes may include, but are not limited to: a change in the icon dragging rate for a data file icon; an emulation of a repulsive force between a data file icon and a file hosting icon; a change to a visual appearance (e.g., color) of the data file icon; and/or a change to a visual appearance (e.g., color) of a receptive file hosting icon that is accepting a data file via a drag-and-drop operation with the data file icon.

Sometimes, certain files or classes of files may be discouraged (but perhaps not totally excluded) for transfer to a file hosting service (i.e., an on-line network-based service that provides cloud storage of files, which allow a user/ computer to selectively share files with other users/persons/ computers). Certain file hosting services provide a same file hosting icon to each authorized system/user, thus giving the appearance of each authorized system/user having access to one or more files from the file hosting service.

Thus, in accordance with one or more embodiments of the present invention, storing and/or retrieving particular data files from a file hosting service is performed by a drag-and-drop operation, in which certain files are dragged into and dropped onto a file sharing icon, resulting in the storage of an underlying data file into the file hosting service (i.e., into one or more storage devices hosted by the file hosting service). As described herein, however, this drag-and-drop operation is modified to alter the GUI characteristics of the movement of a data file icon used to drop files into the file hosting service (according to traits of the underlying data file and file hosting service). The GUI characteristics are adjusted according to various parameters, including but not limited to the confidentiality, sensitivity, size, etc. of the underlying data file, and/or the characteristics of the file hosting service.

Figure 2:
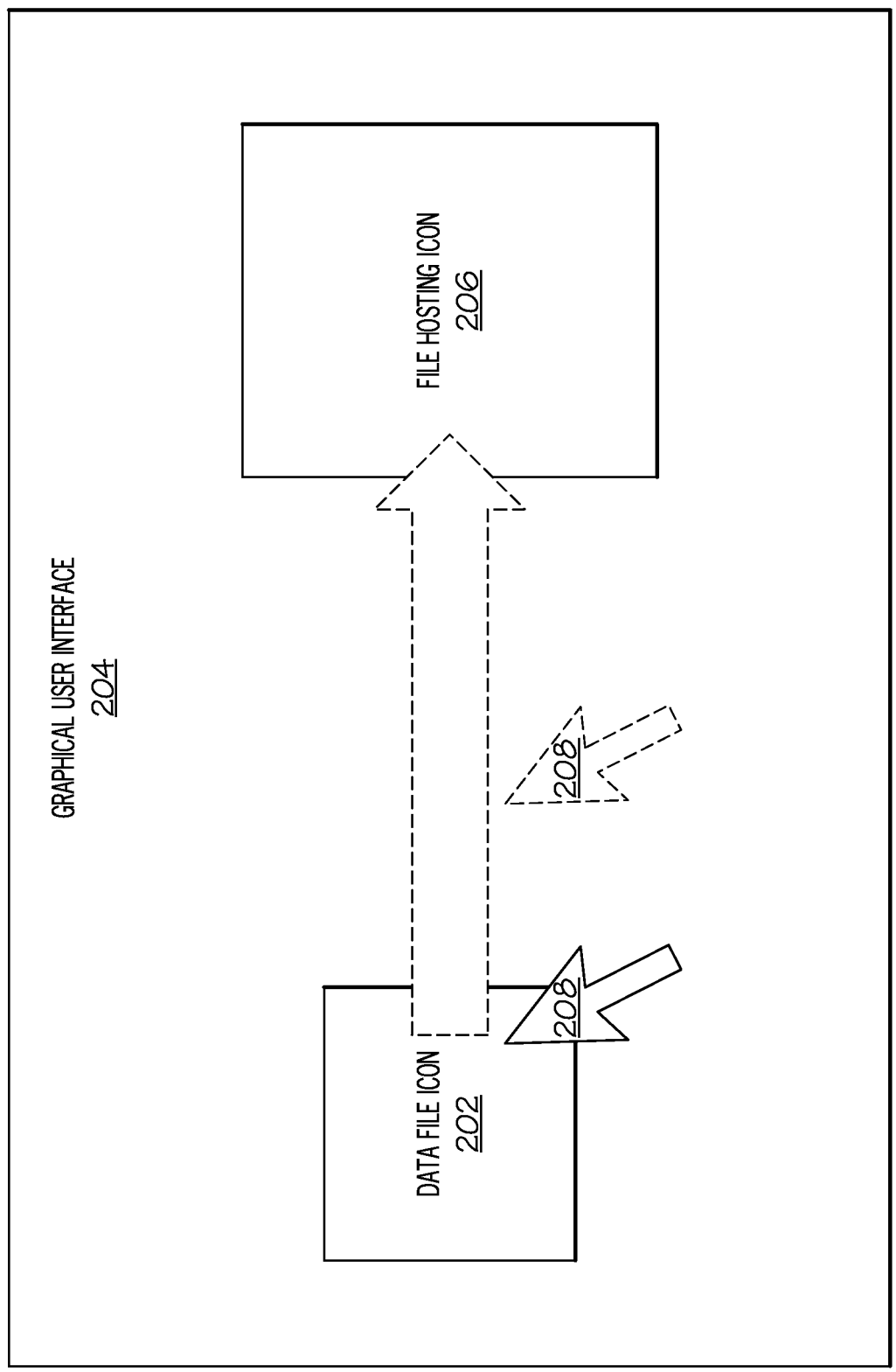
FIG. 2 illustrates movement of a data icon towards a file hosting icon across an exemplary Graphical User Interface (GUI) in accordance with one or more embodiments of the present invention.

For example, as shown in FIG. 2, assume that a user is dragging a data file icon 202 on the Graphical User Interface 204 to a file hosting icon 206, such that the underlying data file represented by the data file icon 202 will be dropped into (i.e., stored within) a storage device provided by the file hosting service represented by the file hosting icon 206. However, this drag-and-drop operation may be inadvisable. For example, the data file represented by the data file icon 202 may be of a sensitive nature, such that the user probably does not want to share this data file with others via the file hosting service. In order to provide a visual, tactile, and/or other feedback suggesting that this may not be advisable, the characteristics of the drag-and-drop operation are altered.

For example, the actual drag rate for moving the data file icon 202 onto the file hosting icon 206 may change (e.g. slow down as if dragging through a viscous fluid), which would encourage user reflection upon the dragging act. In one embodiment, this change is reflected in a disconnection between a cursor 208 and the data file icon 202, with a subsequent pull by the cursor 208. That is, assume that the user had clicked the cursor 208 while hovering over the data file icon 202. Ordinarily, subsequently moving the cursor towards with file hosting icon 206 would result in the data file icon 202 moving along with the cursor 208. However, in one or more embodiments of the present invention, the cursor 208 disengages from the data file icon 202, as shown in the dashed line representation of cursor 208. This disconnection allows the cursor 208 to no longer be over the data file icon 202. However, the data file icon 202 is nonetheless drawn toward the new position (represented by the dashed line outline of cursor 208), although at an altered (slower) movement rate. That is, the cursor 208 now "pulls" the data file icon 202 to the new position shown in the dashed line representation of cursor 208.

This change to the operation of the cursor 208 provides a prompt to the user, indicating that there is something amiss going on (i.e., it might be inadvisable to drop the data represented by data file icon 202 into the file hosting service represented by file hosting icon 206).

In another embodiment/example of the present invention, the cursor 208 and data file icon 202 remain coupled during the drag-and-drop operation. However, the cursor velocity for cursor 208 is dynamically adjusted. For example, assume that cursor 208 is set up to move one inch across the GUI 204 for every one inch of physical movement of the mouse (not shown) that is controlling the cursor 208 (i.e., a 1:1 ratio). However, if the system determines that it may be inadvisable to drop the data represented by data file icon 202 into the file hosting system represented by file hosting icon 206, then the ratio of movement of the cursor 208 to the mouse may change to a 2:1 ratio, such that the user must move the mouse 2 inches in order to move the cursor 208 one inch across the GUI 204. This difference in movement ratios will likewise provide the user with notice that the drop-and-drag movement may be problematic and/or inadvisable.

Figure 3:
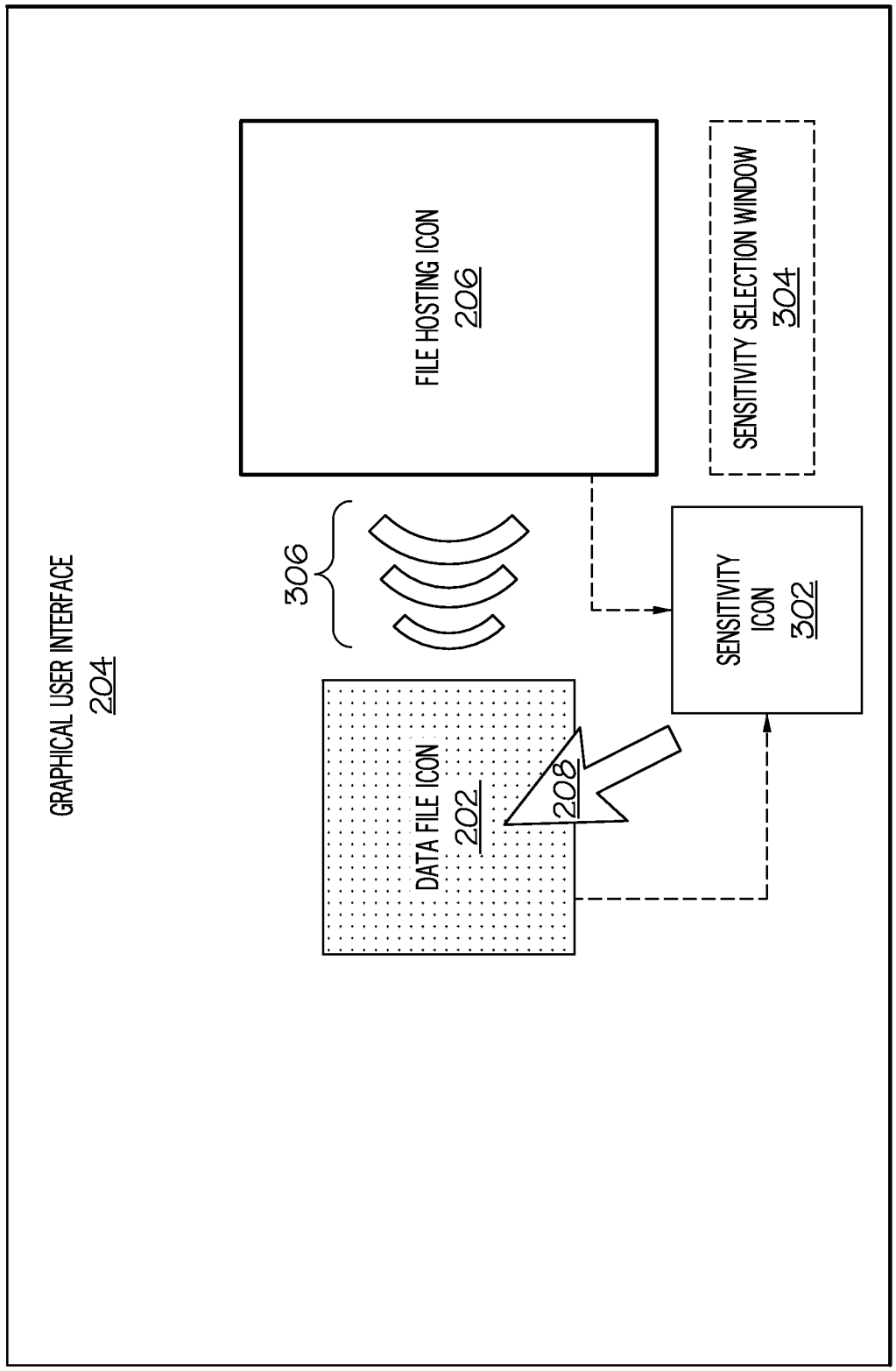
FIG. 3 depicts a variable level of repulsion fields around a file hosting icon on a GUI.

Other visual characteristics may indicate that the drag-and-drop operation just described may be problematic. For example, as shown in FIG. 3, if the user is dragging the data file icon 202 towards the file hosting icon 206, and the system determines that this may be inadvisable, then the visual appearance of the data file icon 202 may change (e.g., may change the shape, size, color, outline, or as shown, shading of the data file icon 202). Similarly, the visual appearance of the file hosting icon 206 may also change (e.g., by changing the shape, size, color, shading, or as shown, the outline of the file hosting icon 206).

While the system has been described thus far as the system merely discouraging the storage of data represented by data file icon 202 into a file hosting service represented by file hosting icon 206, in one embodiment the system may prohibit such storage (by blocking the data file icon 202 from being dropped onto the file hosting icon 206). As such, the user may want to change the sensitivity level of the system. In order to enable this change, one or more embodiments of the present invention utilize a sensitivity icon 302, as shown being displayed on the GUI 204 in FIG. 3. By dragging the data file icon 202 or the file hosting icon 206 onto the sensitivity icon 302 (or vice versa), a pop-up window or other graphical device such as the depicted sensitivity selection window 304 will appear, giving the user various options for adjusting the sensitivity of storing data represented by data file icon 202 into a file hosting service represented by file hosting icon 206. A user-selected sensitivity option is then sent to the system (e.g., computer 102 shown in FIG. 1), causing an adjustment to the characteristics of movement of the data file icon 202.

For example, assume that an initial setting of the system discourages or prohibits storing data represented by data file icon 202 into an unprotected and publicly-accessible file hosting service represented by file hosting icon 206, due to the presence of financial information found in the data represented by data file icon 202. However, the user and/or system may subsequently determine that such financial information is no longer sensitive (e.g., has been publicly disclosed), such that the storage of such financial information can now comfortably be stored in this unprotected and publicly-accessible file hosting service. Based on this subsequent determination, the system will accept an input from the user (from one of the options provided by sensitivity selection window 304), lowering the sensitivity level of the system, such that the data represented by data file icon 202 can be "dragged and dropped" onto the file hosting icon 206 for storage in the underlying file hosting system/service.

File sensitivity may be estimated based on various factors including any of: a topic analysis of text in a document (i.e., the file is analyzed to determine the content and context of the data contained therein); a file name (e.g., any file named "Confidential" or "Financial" will be deemed to be sensitive); a file type (e.g., a spreadsheet file may be deemed more likely to be sensitive than a text file); file metadata (e.g., metadata such as "Confidential financial records" will indicate that the data is highly sensitive); etc.

As described herein, characteristics of the movement of the cursor 208 can be modified to emulate viscosity on the GUI 204. That is, movement of the cursor 208 may slow down (i.e., the mouse must be moved a greater distance or the data file icon 202 is detached from the cursor 208, as described above), giving the appearance of the data file icon 202 moving through a thick, viscous medium. This viscosity of this emulated medium may be uniform across all areas between the data file icon 202 and the file hosting icon 206, or the viscosity may vary. That is, imagine a uniform film of viscous material being between the data file icon 202 and the file hosting icon 206. As the cursor 208 drags the data file icon 202 through this emulated film of viscous material, the resistance and viscosity of the material remains constant. However, in another embodiment, the viscosity changes depending on where the data file icon 202 is located. For example, as the data file icon 202 gets closer to the file hosting icon 206, it becomes harder to "pull" the data file icon 202, since the viscosity of the emulated material on the GUI 204 is increasing. This increased difficulty in "pulling" the data may be manifested in various ways described herein, such as forcing the user to move the system's mouse farther in order to drag the data file icon 202 a same distance. That is, when the data file icon 202 is two inches from the file hosting icon 206 on the GUI 204 in FIG. 2, then there may be a 1:1 ratio of mouse movement to icon movement. However, when the data file icon 202 is only one inch from the file hosting icon 206 on the GUI 204, then the user may have to move the mouse two inches in order to make the data file icon 202 move one inch (a 2:1 ratio).

Another way to envision the change to resistance to movement of the data file icon 202 is shown by the emulated repulsion field 306 shown in FIG. 3. Emulated repulsion field 306 emulates a variable force field surrounding the file hosting icon 206. As the data file icon 202 gets closer to the file hosting icon 206, the emulated repulsion field 306 gets stronger, making movement of the data file icon 202 more difficult (i.e., slower, requiring more movement of the mouse, etc.). In a preferred embodiment of the present invention, the emulated repulsion field 306 is displayed on the GUI 204 as shown in FIG. 3, thus giving the user a visual cue as to why the movement of the data file icon 202 is being altered.

In one or more embodiments of the present invention, the emulated viscosity and/or emulated repulsion field 306 described above, and changes thereto, are based on the degree of: file sensitivity (i.e., such that files that are predetermined to be more sensitive will cause the viscosity/field to be increased); a size of the file (e.g., larger files will cause the viscosity/field to be increased); a file name or type (e.g., media file types will cause the viscosity/field to be increased while text file types will cause the viscosity/field to be decreased); a size of the file in proportion to an allowed maximum size or quota for the file hosting service (e.g., if the storage device provided by the file hosting service is reaching its maximum capacity, then the viscosity/field will be increased); etc.

In another embodiment, the movement of the file hosting icon 206 may be further adjusted according to a user profile, which describes the current user of the GUI 204. That is, the emulated viscosity and/or emulated repulsion field 306 described above may be increased or decreased based on information relating to the user, as described in a user profile used by the system. For example, if the user's profile indicates that the user is personally restricted from using a particular storage device (represented by file hosting icon 206), then the movement of the data file icon 202 is similarly restricted (i.e., by preventing the data file icon 202 from ever reaching the file hosting icon 206 or at least restricting the movement of data file icon 202 toward file hosting icon 206).

Figure 4:
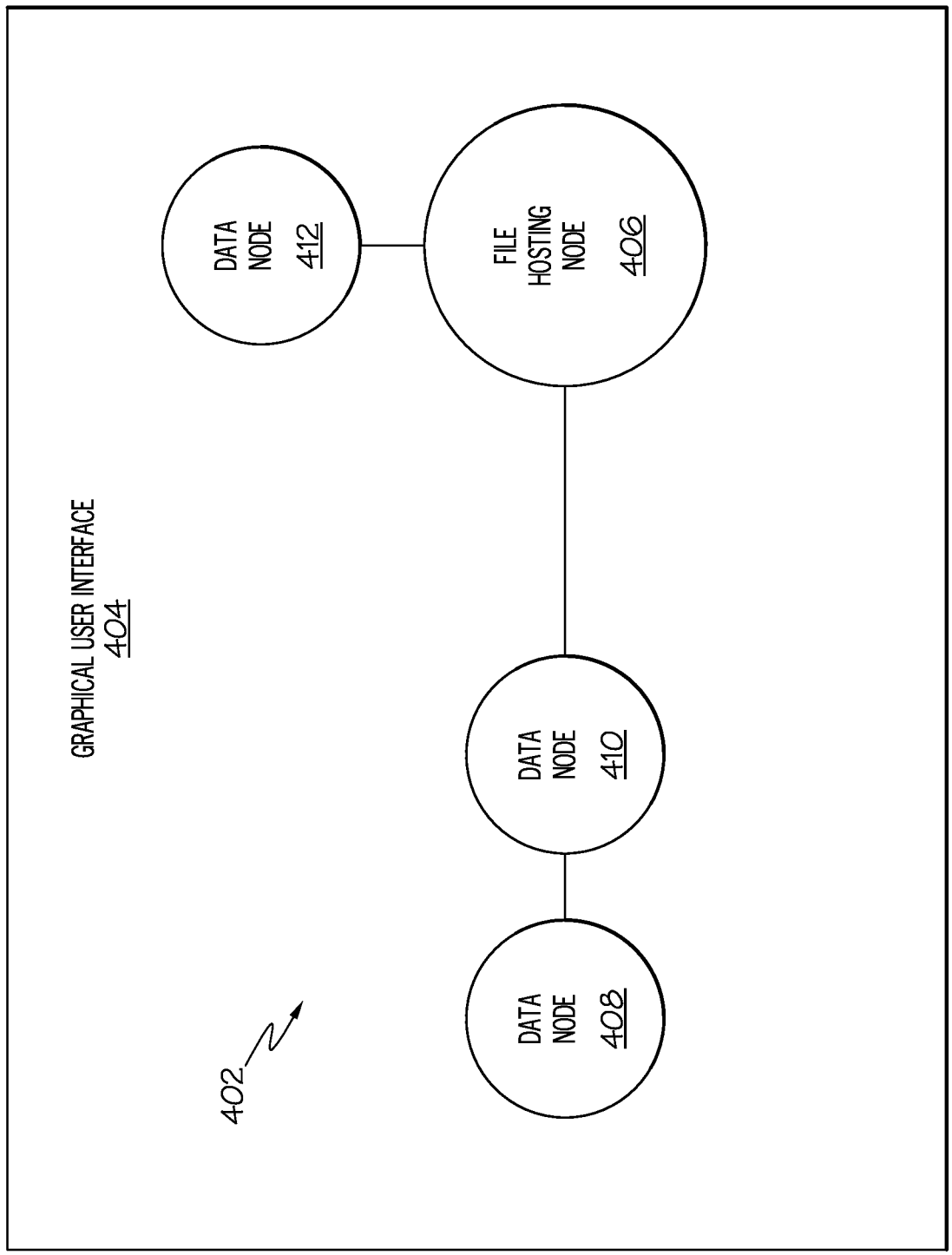
FIG. 4 illustrates an exemplary force directed graph of data nodes relative to a file hosting node.

With reference now to FIG. 4, an exemplary force directed graph 402 depicting the relationship between data files and a file hosting service is shown on a GUI 404. A file hosting node 406 is analogous to the file hosting icon 206 shown in FIG. 2, and more specifically the underlying file hosting service. That is, file hosting node 406 represents a file hosting service and the characteristics (limitations, resources, restrictions, etc.) of that file hosting service.

Also shown on the force directed graph 402 are data nodes 408, 410, and 412, each of which represent a data file and the characteristics (sensitivity, type of file, size of file, etc.) of that data file. The distance between a particular data node and the file hosting node 406 represents how much repulsive "force" is between the two nodes. That is, consider the depicted distance between data node 412 and file hosting node 406, which is quite short. This indicates that there is little repulsive force between data node 412 and file hosting node 406, indicating that there are few, if any, reasons not to store/drop data represented by data node 412 into the file hosting service represented by file hosting node 406.

However, the distance between data node 410 and file hosting node 406 is much longer than that between data node 412 and file hosting node 406, indicating that there is a greater repulsive force between data node 410 and file hosting node 406, indicating that there is strong support for not storing/dropping data represented by data node 410 into the storage devices supported by the file hosting service represented by file hosting node 406. For example, the data represented by data node 410 may exceed a predetermined size, may be of a certain file type, may be deemed sensitive, etc., any or all of which are traits that make storage of this data on the file hosting service represented by file hosting node 406 inadvisable (e.g., due to the unsecure nature of the resources in this file hosting service, the amount of remaining storage capacity in this file hosting service, etc.)

Note further that data node 408 represents data that is dependent upon and/or otherwise related to data node 410. Thus, a transitive relationship between the data represented by data node 410 and the data represented by data node 408 indicates that there is even greater pressure not to store the data represented by data node 408 in the file hosting service represented by file hosting node 406. Even though no explicit policy regarding the sensitivity of data node 408 with regard to file hosting node 406 exists, the transitive relationship transfers sensitivity of data node 410 to data node 408. This relationship is established by means of one of a set of other metrics, including topic relatedness, as determined by Latent Semantic Analysis, similarity of date of file creation, similarity of file size, keywords, or metadata included with the file, such as field names, personal identifiers.

Thus, the force directed graph 402 provides a quick visual representation that describes the relationship of various data nodes and the file hosting node 406. In one or more embodiments, if the system adjusts the drag-and-drop movement of a data file icon (e.g., as described above with regard to FIG. 2 and FIG. 3), then the force directed graph 402 can be presented to a user (either automatically or upon a request from the user), allowing the user to understand why the movement characteristics of the data file icon 202 have changed. In a preferred embodiment, the names of the data nodes (e.g., data nodes 408, 410, 412) and the file hosting node 406 are given names that correspond with a displayed name of the data file icon 202 and/or the file hosting icon 206. That is, assume that data file icon 202 in FIG. 2 represents the same data as that represented by data node 410. In this example, data file icon 202 and data node 410 may both be given the same name "DATA A", such that the user is immediately able to determine their relationship (as representing the same data file). Alternately, the GUI (e.g., GUI 204) may reveal why the movement characteristics of the data file icon 202 have changed by changing the mode of drag and drop from "pointer-specific" to "apply-to-all." In the latter mode, a user dragging a single visible icon (e.g., data file icon 202) to the file hosting node 206 icon will trigger a similar movement of all visible icons to the hosting node 206 icon, proportional to and transmitted through the force directed graph connections. Thus the movement of each icon to the hosting node 206 will reveal which nodes are sensitive and therefore subject to repulsion transmitted through the force directed graph connections to the node represented by the icon which the user has clicked on and is dragging.

While the present invention has been described thus far in a two dimensional (2-D) GUI, the system, method, and processes described are also applicable in a 3-D environment. For example, if the icons/nodes described above are represented in 3-D (e.g., using a virtual reality system, 3-D avatars, etc.), then the resistance to movement described above will apply in 3-D.

Furthermore, while the present invention has been described as giving the user a warning of potential problems through the use of altered movement characteristics of icons, other warnings can also be used, in lieu of or in supplementation of the altered movement characteristics of icons. For example, if the system deems it inadvisable to drop a particular data file into a particular storage resource provided by a file hosting service, then a feedback signal (e.g., vibration) can be generated in the user's mouse, an audible alarm may sound, etc. In a preferred embodiment, such ancillary warnings will vary as the data file icon 202 (shown in FIG. 2) gets closer to the file hosting icon 206.

Figure 5:
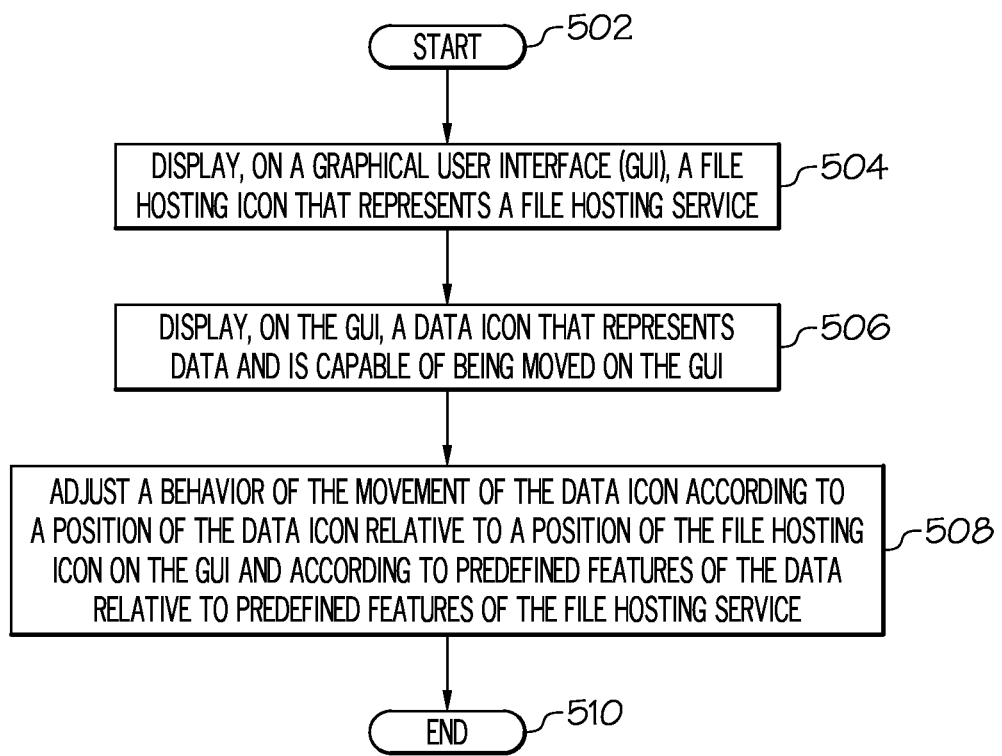
FIG. 5 is a high-level flow chart of one or more steps performed by a processor to control icon movement behavior on a graphical user interface.

With reference now to FIG. 5, a high-level flow chart of one or more steps performed by a processor to control icon movement behavior on a graphical user interface is presented.

After initiator block 502, a file hosting icon (e.g., file hosting icon 206 shown in FIG. 2) is displayed on a graphical user interface (e.g., GUI 204 shown in FIG. 2), as depicted in block 504. As described herein, the file hosting icon represents a file hosting service, which allows multiple computers to access a same data file.

As described in block 506, a data file icon (e.g., data file icon 202 shown in FIG. 2) is also displayed on the GUI along with the file hosting icon. The data file icon, which represents a data file (i.e., data) is capable of movement on the GUI, such as movement towards the file hosting icon.

As described in block 508, one or more processors adjust a behavior of the movement of the data file icon according to a position of the data file icon relative to a position of the file hosting icon on the GUI, and according to predefined features of the data relative to the file hosting service. That is, movement features of the data file icon are adjusted according to the data file icon moving towards the file hosting icon, and/or are further adjusted according to how close the data file icon is to the file hosting icon, based on features of the represented data (e.g., size, sensitivity, etc.) relative to features of the file hosting service (e.g., capacity, resources, security, etc.).

The flow-chart of FIG. 5 ends at terminator block 510.

In one embodiment of the present invention, adjusting the behavior of the movement of the data file icon on the GUI results in a drag rate change in the movement of the data file icon. That is, the rate/speed at which an icon moves relative to movement of the mouse changes based on the relationship between the data represented by the data file icon relative to features of the file hosting service represented by the file hosting icon.

In one embodiment of the present invention and as described herein, adjusting the behavior of the movement of the data file icon on the GUI results in an emulation on the GUI of a repulsive force between the data file icon and the file hosting icon. That is, as the data file icon is dragged across the GUI, it behaves as if it is being dragged through a repulsive force field (see element 306 in FIG. 3), thus giving the user an indication that it might be inadvisable to drop the data into the file hosting service's storage device.

In one embodiment of the present invention, adjusting the behavior of the movement of the data file icon on the GUI results in a change in viscosity of an emulated medium through which the data file icon travels on the GUI. That is, as the data file icon is dragged across the GUI, it behaves as if it is being dragged through a viscous material, thus giving the user an indication that it might be inadvisable to drop the data into the file hosting service's storage device. The viscosity level may be adjusted based on a level of sensitivity of the data (i.e., if the data represented by the data file icon is highly sensitive, then the level of viscosity being emulated is high); a proximity of the data file icon to the file hosting icon on the GUI (i.e., the emulated viscosity gets stronger as the data file icon gets closer to the file hosting icon); a profile of a user of the GUI (e.g., if the profile of the user of the GUI shows that he/she has tenuous authority to drop data into the file hosting service, then the emulated viscosity is high, making the user "work hard" at dragging the data file icon); a predefined level of trustworthiness of the file hosting service (i.e., if the file hosting service is not protected by proper password protection, firewalls, etc., then the emulated viscosity is high, giving the user feedback indicating that it is inadvisable to drop sensitive data into such an unprotected environment); a history of security incidents involving the file hosting service (i.e., if the file hosting service has a history of being attacked by nefarious actors, then the emulated viscosity is high, giving the user feedback indicating that it is inadvisable to drop sensitive data into such a dangerous environment); etc.

In one embodiment of the present invention, the visual appearance of the data file icon and/or the file hosting icon are adjusted according to 1) the type of data being represented by the data file icon, and 2) the characteristics of the file hosting service represented by the file hosting icon. For example, the color, shading, border, etc. of the data file icon and/or the file hosting icon can be adjusted as the data file icon is moving relative to the file hosting icon, based on the predefined features of the data being represented by the data file icon and/or predefined features of the file hosting system represented by the file hosting icon. (See FIG. 3.)

In one embodiment of the present invention (see FIG. 3), one or more processors detect that the file hosting icon and/or the data file icon is being dragged towards a sensitivity icon (e.g., sensitivity icon 302 in FIG. 3). In response to detecting that the file hosting icon and/or data file icon has been dragged and dropped onto the sensitivity icon, one or more processors present sensitivity options to a user (e.g., via the sensitivity selection window 304 shown in FIG. 3). One or more processors then receive a selected sensitivity option from the user, which alters the behavior of the movement of the data file icon according to the position of the data file icon relative to the position of the file hosting icon on the GUI. That is, the user and/or the system determine the level of sensitivity involved in dropping data files of a particular description into the file hosting system by selecting a sensitivity level from the sensitivity selection window 304. If the prior sensitivity level was too high (based on the user's judgement or according to a determination made by the system by executing logic from IMCL 148 shown in FIG. 1), then this sensitivity level can be lowered, thus making it "easier" (less "resistance" from emulated viscosity, repulsive fields, etc.) to drag the data file icon to the file hosting icon from dropping thereon.

As described herein, in one embodiment of the present invention, the predefined features of the data being represented by the data file icon (which determine the movement characteristics associated with dragging the data file icon) include a description of a predefined confidentiality level of the data represented by the data file icon. That is, if the data represented by the data file icon is highly sensitive, then the viscosity/repulsive field/etc. will also be high. However, if the data represented by the data file icon is not sensitive, then the viscosity/repulsive field/etc. will be relatively lower (as compared to the viscosity/repulsive field/etc. that is emulated for highly sensitive data).

In one embodiment of the present invention, the predefined features of the data being represented by the data file icon include a description of a size of the data represented by the data file icon. For example, if the size of the data is extremely large (e.g., more than 1 Terabyte of data), then the file hosting service may not have the bandwidth or storage capacity for handling the storage, sharing, and management of such a large amount of data.

In one or more embodiments of the present invention, the GUI depicted in various figures presented herein is on an electronic device (e.g., a smart phone, a tablet computer, etc.). A determination is made, based on readings from a geophysical positioning device within the electronic device (e.g., using GPS 158 shown in FIG. 1 or using camera 156 to record an image of the environment of the computer 102), of a real-time location of the electronic device. Based on where the electronic device is currently located, one or more processors further adjust the behavior of the movement of the data file icon according to the real-time location of the electronic device. For example, assume that the electronic device is within a research and development laboratory of an enterprise, that data represented by the data file icon is stored on the electronic device, and that the user is trying to drop this data onto a storage device provided by a file hosting service that allows other users to see/share the data. A presumption can be made that data on the electronic device is related to research and development activities that occurred within the laboratory. As such, the user is discouraged (by the alteration to the movement characteristics of the data file icon) from dropping this data onto this file hosting service.

In one or more embodiments of the present invention, an explanation for the behavior of the movement of the data file icon is provided. This explanation may be in the form of a force directed graph 402 (see FIG. 4), or it may be a text-based explanation, describing why it is inadvisable to drop certain data (represented by the data file icon 202 shown in FIG. 2) into the file hosting service (i.e., a storage device in the file hosting service represented by file hosting icon 206 in FIG. 2). For example, assume that a first data file icon and a second data file icon are presented on the GUI, such that the first data file icon represents a first data file and the second data file icon represents a second data file. A force directed graphical representation of a relationship between the first data file and a second data file (see FIG. 4) is presented on the GUI, thus describing shared movement properties of the first data file icon and the second data file icon relative to each other and to the file hosting icon, thereby providing an explanation for the behavior of the movement of the first data file icon and the second data file icon.

In one or more embodiments of the present invention, the file hosting icon is displayed on a GUI on a first computer (e.g., computer 102 shown in FIG. 1). However, one or more processors (e.g., processor 104) also identify the file hosting icon being displayed on a GUI on a second computer (e.g., second computer 154 shown in FIG. 1). This indicates that the second computer has access to the file hosting service that is being used by the first computer to drop a data file therein. One or more processors then retrieve a profile for a user of the second computer, and then further adjust the behavior of the movement of the data file icon according to the profile for the user of the second computer. For example, assume that the profile of the user of the second computer indicates that he/she is a business competitor, is presently located in an insecure location (e.g., within a public location where the general public can easily see data displayed on the second computer, as determined by a GPS 158 within the second computer), etc., thus indicating that allowing the data to be shared via the data hosting service may be inadvisable. Based on this determination, the "resistance" to movement of the data file icon 202 is increased, giving the user of the first computer additional warning of potential consequences of dropping data into the file hosting service's resources.

The present invention may be implemented using cloud computing, as now described. Nonetheless, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
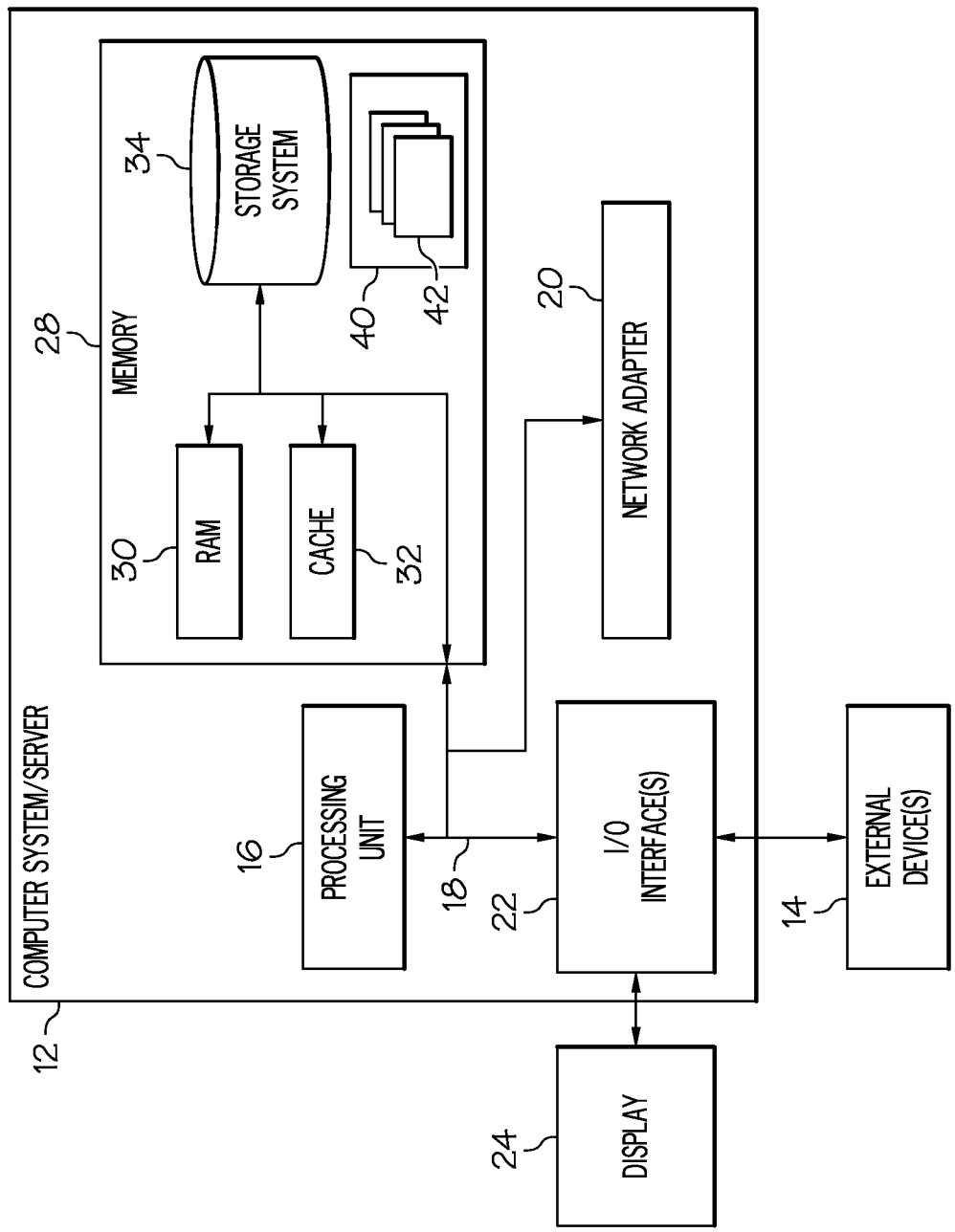
FIG. 6 depicts a cloud computing node according to an embodiment of the present disclosure.

Referring now to FIG. 6, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 7:
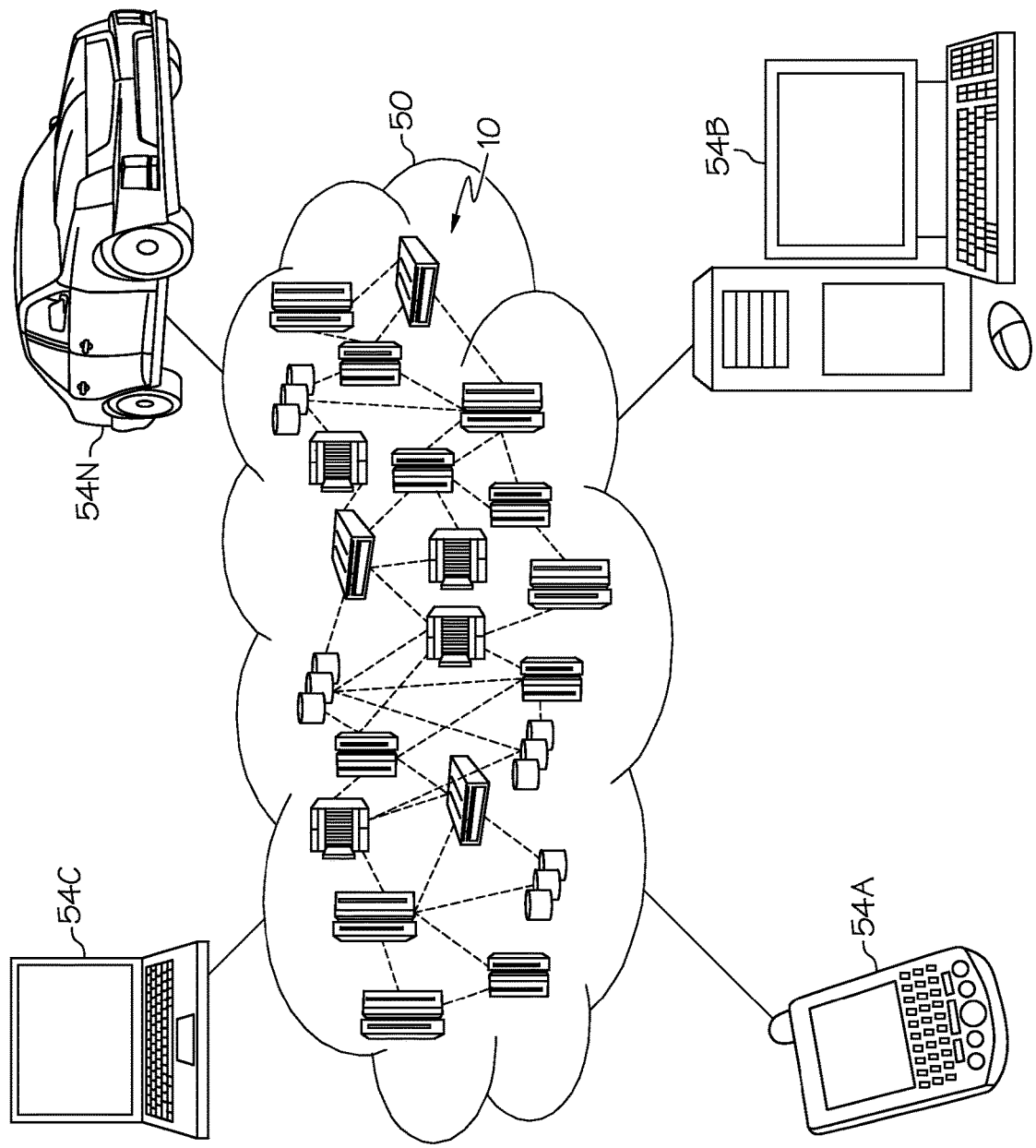
FIG. 7 depicts a cloud computing environment according to an embodiment of the present disclosure.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
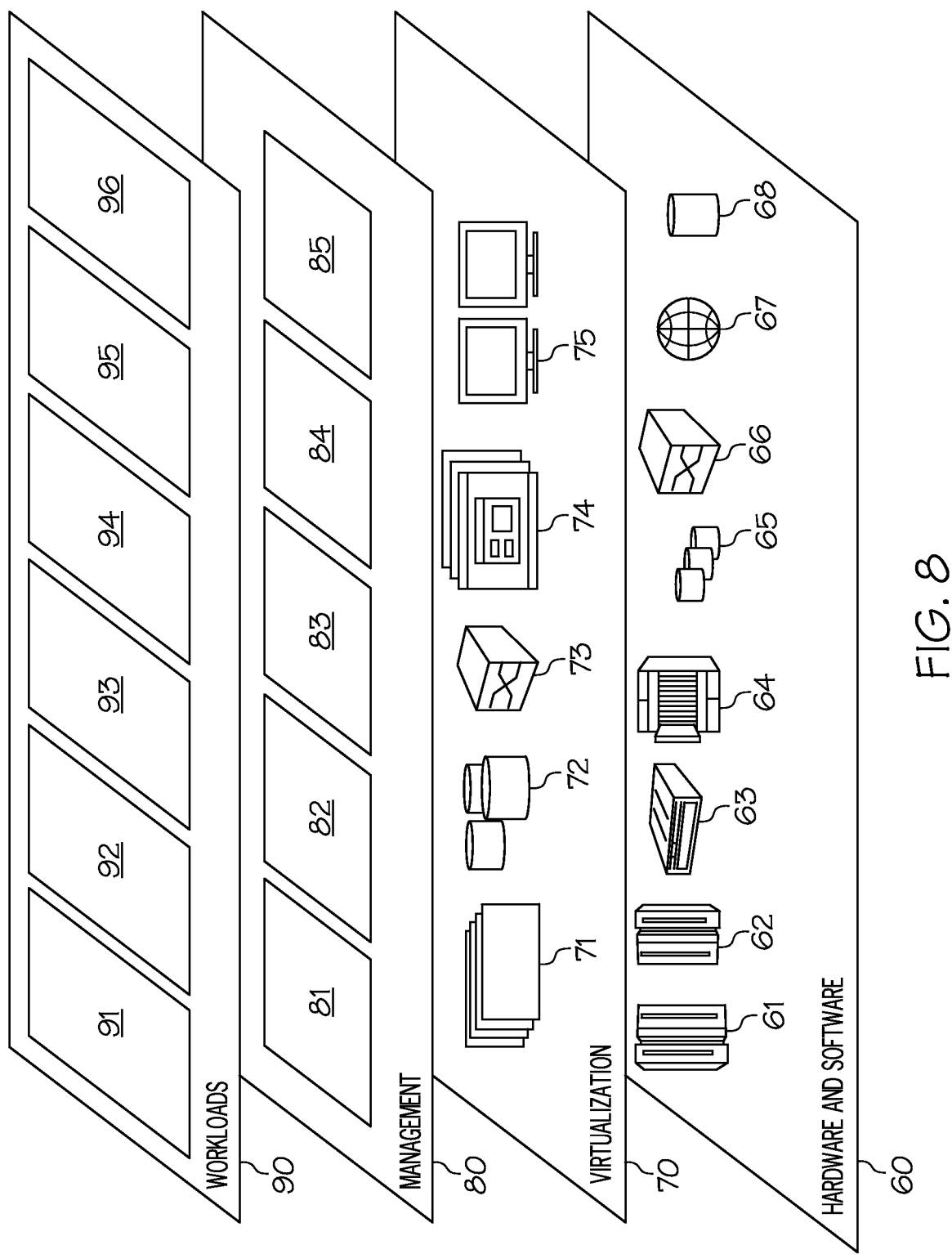
FIG. 8 depicts abstraction model layers according to an embodiment of the present disclosure.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and user-interface control processing 96 (for controlling the movement/actions of icons as described herein).

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method of controlling icon movement behavior on a graphical user interface, the method comprising:
    displaying, on a graphical user interface (GUI), a file hosting icon, wherein the file hosting icon represents a file hosting service;
    displaying, on the GUI, a data file icon, wherein the data file icon represents data, and wherein the data file icon is capable of movement towards the file hosting icon on the GUI to initiate storage of the data by the file hosting service;
    adjusting, by one or more processors, a behavior of the movement of the data file icon according to a position of the data file icon relative to a position of the file hosting icon on the GUI and according to predefined features of the data relative to predefined features of the file hosting service, wherein said adjusting the behavior of the movement of the data file icon on the GUI results in a change in viscosity of an emulated medium through which the data file icon travels on the GUI; and
    adjusting, by one or more processors, the viscosity of the emulated medium based on a history of security incidents involving the file hosting service.

2. The method of claim 1, wherein said adjusting the behavior of the movement of the data file icon on the GUI results in a drag rate change in the movement of the data file icon.

3. The method of claim 1, wherein said adjusting the behavior of the movement of the data file icon on the GUI results in an emulation on the GUI of a repulsive force between the data file icon and the file hosting icon.

4. The method of claim 1, further comprising:
    adjusting, by one or more processors, the viscosity of the emulated medium based on a proximity of the data file icon to the file hosting icon on the GUI.

5. The method of claim 1, further comprising:
    adjusting, by one or more processors, the viscosity of the emulated medium based on a profile of a user of the GUI.

6. The method of claim 1, further comprising:
    adjusting, by one or more processors, the viscosity of the emulated medium based on a predefined level of trustworthiness of the file hosting service.

7. The method of claim 1, further comprising:
    detecting, by one or more processors, a dragging of the file hosting icon to a sensitivity icon;
    in response to detecting that the file hosting icon has been dragged and dropped onto the sensitivity icon, presenting, by one or more processors, sensitivity options to a user;
    receiving, by one or more processors, a selected sensitivity option from the user, wherein the selected sensitivity option alters the behavior of the movement of the data file icon according to the position of the data file icon relative to the position of the file hosting icon on the GUI.

8. The method of claim 1, wherein the predefined features of the data being represented by the data file icon include a description of a predefined confidentiality level of the data represented by the data file icon.

9. The method of claim 1, wherein the predefined features of the data being represented by the data file icon include a description of a size of the data represented by the data file icon.

10. The method of claim 1, wherein the GUI is on an electronic device, and wherein the method further comprises:
    determining, based on readings from a geophysical positioning device within the electronic device, a real-time location of the electronic device; and
    further adjusting, by one or more processors, the behavior of the movement of the data file icon according to the real-time location of the electronic device.

11. The method of claim 1, further comprising:
    presenting a first data file icon and a second data file icon on the GUI, wherein the first data file icon represents a first data file and the second data file icon represents a second data file; and
    presenting, on the GUI, a force directed graphical representation of a relationship between the first data file and a second data file describing shared movement properties of the first data file icon and the second data file icon relative to each other and to the file hosting icon, wherein said representation provides an explanation for the behavior of the movement of the first data file icon and the second data file icon.

12. The method of claim 1, wherein the movement of the data file icon is for a drag-and-drop operation, wherein the drag-and-drop operation places the data into the file hosting service.

13. A method of controlling icon movement behavior on a graphical user interface, the method comprising:
    displaying, on a graphical user interface (GUI), a file hosting icon, wherein the file hosting icon represents a file hosting service;
    displaying, on the GUI, a data file icon, wherein the data file icon represents data, and wherein the data file icon is capable of movement towards the file hosting icon on the GUI to initiate storage of the data by the file hosting service;
    adjusting, by one or more processors, a behavior of the movement of the data file icon according to a position of the data file icon relative to a position of the file hosting icon on the GUI and according to predefined features of the data relative to predefined features of the file hosting service; and
    adjusting, by one or more processors, a color of the data file icon as the data file icon is moving relative to the file hosting icon, wherein the color of the data file icon is adjusted based on the predefined features of the data being represented by the data file icon.

14. A method of controlling icon movement behavior on a graphical user interface, the method comprising:
    displaying, on a graphical user interface (GUI), a file hosting icon, wherein the file hosting icon represents a file hosting service;
    displaying, on the GUI, a data file icon, wherein the data file icon represents data, and wherein the data file icon is capable of movement towards the file hosting icon on the GUI to initiate storage of the data by the file hosting service;
    adjusting, by one or more processors, a behavior of the movement of the data file icon according to a position of the data file icon relative to a position of the file hosting icon on the GUI and according to predefined features of the data relative to predefined features of the file hosting service; and
    adjusting, by one or more processors, a color of the file hosting icon as the data file icon is moving relative to the file hosting icon, wherein the color of the file hosting icon is adjusted based on the predefined features of the file hosting service represented by the file hosting icon.

15. A method of controlling icon movement behavior on a graphical user interface, the method comprising:
    displaying, on a graphical user interface (GUI) on a first computer, a file hosting icon, wherein the file hosting icon represents a file hosting service;
    displaying, on the GUI on the first computer, a data file icon, wherein the data file icon represents data, and wherein the data file icon is capable of movement towards the file hosting icon on the GUI to initiate storage of the data by the file hosting service;
    adjusting, by one or more processors, a behavior of the movement of the data file icon according to a position of the data file icon relative to a position of the file hosting icon on the GUI and according to predefined features of the data relative to predefined features of the file hosting service;
    identifying, by one or more processors, the file hosting icon being displayed on a GUI on a second computer;
    retrieving, by one or more processors, a profile for a user of the second computer; and
    further adjusting, by one or more processors, the behavior of the movement of the data file icon on the GUI on the first computer according to the profile for the user of the second computer.

* * * * *